(No Model.) 3 Sheets—Sheet 1.

W. L. BROWN.
CAMERA ATTACHMENT.

No. 256,966. Patented Apr. 25, 1882.

(No Model.) 3 Sheets—Sheet 2.
W. L. BROWN.
CAMERA ATTACHMENT.
No. 256,966. Patented Apr. 25, 1882.
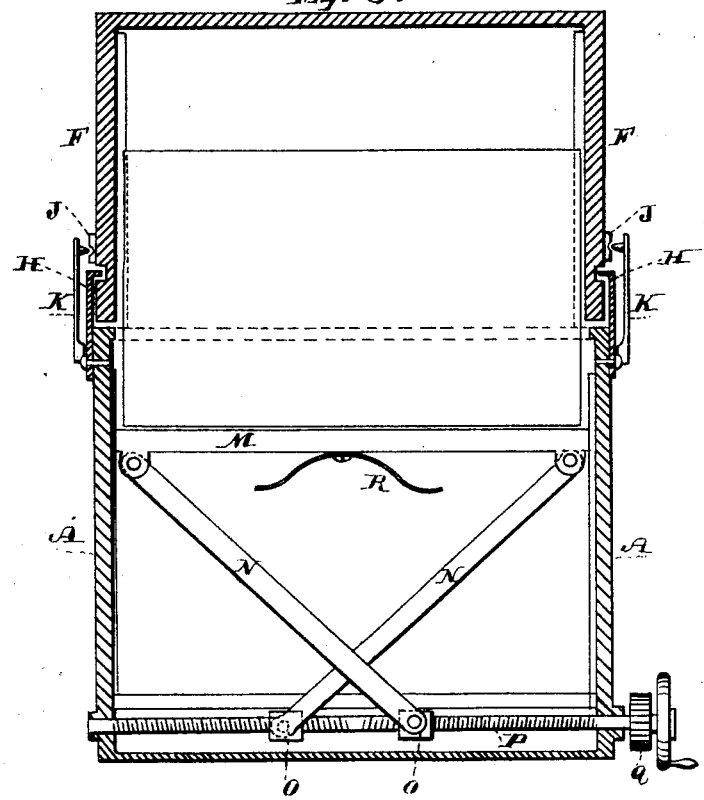
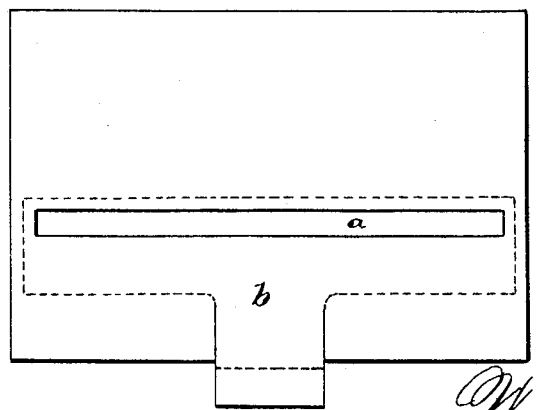
Witnesses
Geo. H. Strong.
Frank A. Brooks.
Inventor
Wilfred L. Brown
By Dewey & Co. Attys (No Model.) 3 Sheets—Sheet 3.

W. L. BROWN.
CAMERA ATTACHMENT.

No. 256,966. Patented Apr. 25, 1882.

Witnesses
Geo. H. Strong.
Frank A. Brooks.

Inventor
Wilfred L. Brown
By Dewey & Co.
Attys.

UNITED STATES PATENT OFFICE.

WILFRED L. BROWN, OF MARE ISLAND, CALIFORNIA.

CAMERA ATTACHMENT.

SPECIFICATION forming part of Letters Patent No. 256,966, dated April 25, 1882.

Application filed September 8, 1881. (No model.)

*To all whom it may concern:*

Be it known that I, WILFRED L. BROWN, of Mare Island, Solano county, State of California, have invented an Improvement in Camera Attachments; and I do hereby declare the following to be a full, clear, and exact description thereof.

My invention relates to certain improvements in photographic apparatus adapted to be used in the field or elsewhere in conjunction with a holder containing a series of prepared sensitized plates; and my invention consists in certain details of construction, as hereinafter described and specifically claimed.

Figure 1:
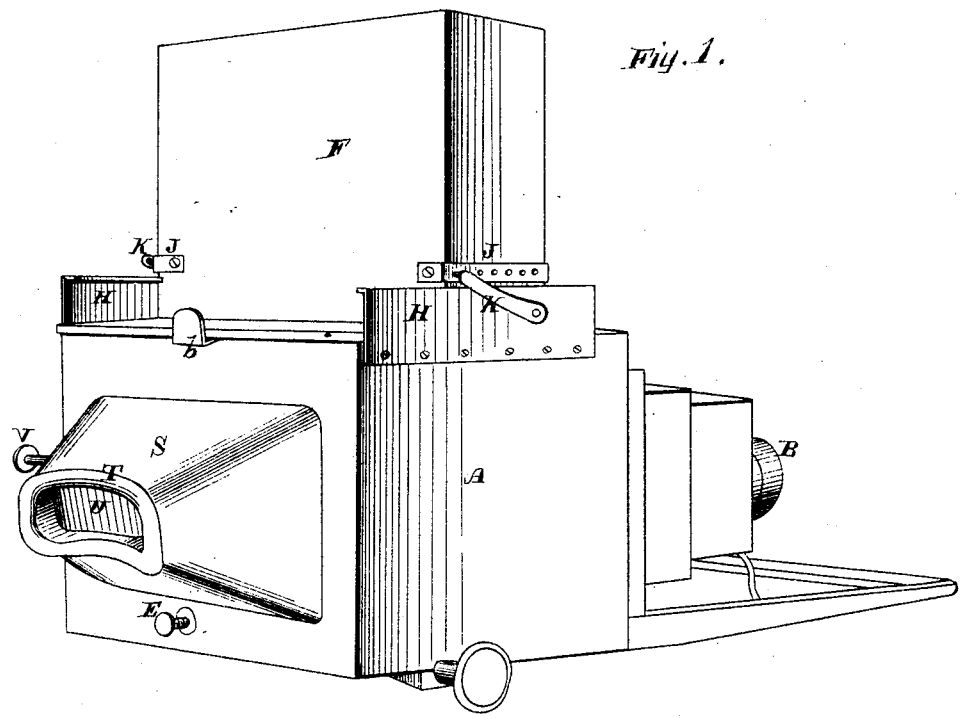
Figure 2:
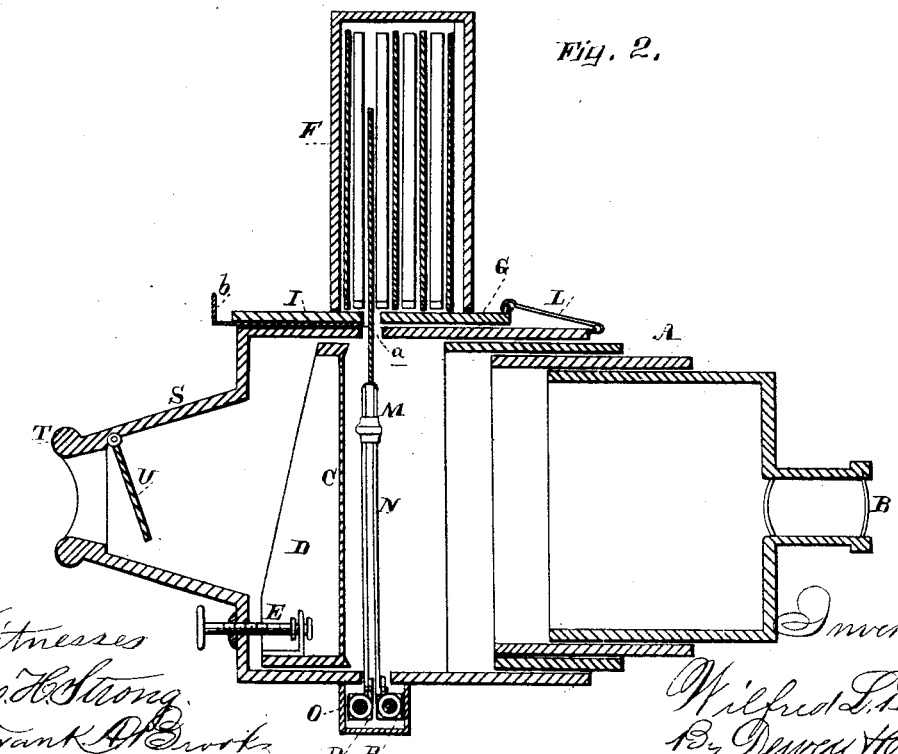
Figure 5:
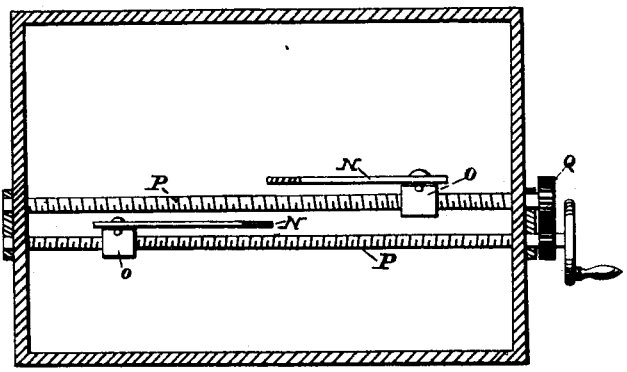

Referring to the accompanying drawings, Figure 1, Sheet 1, is a perspective view of my apparatus. Fig. 2, Sheet 1, is a longitudinal section. Fig. 3, Sheet 2, is a transverse section, showing the plate-elevator. Fig. 4, Sheet 2, is a view showing the slide-shutter for closing the opening in the top of the camera, through which the plate passes. Fig. 5, Sheet 3, shows the operating-screw.

A is the camera, which may be made in any suitable form and with any of the known adjustments. In the present case I have shown the parts of the box as telescoped, so as to move out and in to obtain the proper focal distance.

B is the object-lens.

C is a screen of ground or translucent glass within the camera, upon which the image of any object may be directed from the object-lens. This screen serves to obtain the proper focus, and is mounted upon a movable frame or support, D, which is moved forward and back upon guides by means of a screw, E. This screen is moved forward by the screw to the position to be occupied by the plate or negative, and the proper focus obtained. This screen is then withdrawn, and the apparatus is ready for the plate.

The plate-box F may be of a size to admit such plates as are to be used, and it may have guides or channels between which any number of plates may be introduced after they have been prepared, so as to lie separated from each other. A sliding bottom, G, closes this box, and is drawn back when plates are to be removed. This plate-box is fitted to move between guides H upon the top of the camera, with its sliding bottom downward.

A strip, I, exactly equal in thickness to the sliding bottom of the plate-box, is fixed upon the top of the camera with one edge on a line with the slot or opening $a$, through which the plates are admitted into the camera.

The plate-box is provided with perforated plates, racks, or other suitable devices J, upon each side, into which pawls K may fall. The holes or catches are so determined and marked that when the pawl falls into the first notch the box will have been moved forward in its guides H to a point which will admit plate No. 1 entering the camera through the slot $a$. A hook, L, upon the camera engages a staple or catch upon the sliding bottom G of the plate-box, and thus holds it stationary at a point which will, when the plate-box is moved toward the eye-piece of the camera, expose a narrow slot between the bottom G and the one I, which serves as a false bottom to the plate-box when the latter has been moved far enough to allow the last plate within it to pass into the camera. It will be seen from this construction that whenever the plate-box is moved to a point where the pawls K drop into any notch the plate corresponding with that number will be in position to enter the camera, and all the plates may thus be used whenever desired.

Within the camera what I term the "plate-elevator" is placed. This consists of a flat bar, M, which is of such a width as to exactly fit the slot $a$, and of a length to extend entirely across the camera, its ends moving in vertical slots in the sides of the camera which serve as guides. Two arms, N, are hinged to the opposite ends of M, and have on their lower ends nuts, O, which are loosely pivoted to them. Two horizontal screws, P, extend across the lower part of the box side by side, so that each screw will pass through one of the nuts O.

Upon the adjacent ends of the screw-shafts, outside of the box, are fixed two pinions, Q, which mesh, and a crank, hand-wheel, or other suitable device serves to rotate them, thus turning the screws in opposite directions. When the bar M is up so as to fill the slot $a$ and make a smooth continuation of the top of the box, or rather of the two bottoms G and I, the arms N will extend down to the screws so as to be nearly upright. When the plate-box has been moved to allow a plate to rest upon the bar M, and it is desired to lower it into the camera, the screws P are turned so as to cause the nuts O to traverse them and the arms N to move across each other toward opposite sides of the camera. This movement of the arms across the camera has the effect to draw the bar M down, while retaining its horizontal position, until the plate is wholly within the camera. A spring, R, beneath the bar M relieves it from any shock when it reaches the bottom, which might break the plate. After the plate is in position and has been exposed it is again elevated into the plate-box by reversing the rotation of the screws and thus raising the bar M.

It will be manifest that other mechanism or modification of the elevating and depressing devices might be employed which would serve as well as that here described. A single screw having a right and left thread with two nuts upon it might be used; but the result would be essentially the same.

The plate-opening $a$ may be closed at any time by a sliding shutter, $b$.

The eye-piece S is formed as shown, and the rim T, with which the face comes in contact, is heavily upholstered, and is also curved to fit the shape of the face, so that no screen or focusing-cloth is necessary, and the operator shuts off all light from the interior of the eye-piece while observing.

Within the eye-piece is a shutter, U, having a handle, V, by which it may be turned or opened when the operator is in position to observe the focusing screen or plate, and it may be closed at other times to shut off all light from the interior of the camera. By this construction I am enabled to prepare any desired number of plates and place them in the plate-box, which is then closed up by the sliding bottom, so that no light may enter. Additional plate-boxes may be used, so that when the plates in any one box have been used the box may be removed from the camera and another substituted for it as often as desired. The box is placed upon the top of the camera, as before described, when it is to be used, and by moving it along so that the spring-catches K upon its side fall into the holes or notches corresponding with any one plate this plate will rest upon the plate-elevator bar M, the slide-bottom G being held back by the hook L, while those plates which may be beyond the opening $a$ will rest upon the false bottom I upon the top of the camera. As both the slides G and I and the bar M are in an exact plane, the plate-holder may be moved along to bring any plate upon the bar M without any hitch. The plate is then lowered into the camera by operating the mechanism of the plate-elevator, and when in position may be exposed and the picture taken. The proper focus is previously obtained by moving the focusing-plate into the position to be occupied by the negative and then adjusting the object-lens in the usual manner, after which the focusing-plate is withdrawn, leaving the space ready for the negative. The shutters prevent the ingress of any light into the camera except as desired. All the negative-plates in the plate-box may thus be used and returned to the box without any exposure whatever, except for the picture, and when the operator returns to the work-room they may be developed at leisure.

This apparatus is especially convenient for use in the field, and in all places where there is not time or conveniences for completing the work.

Having thus described my invention, what I claim as new, and desire to secure by Letters Patent, is—

1. The plate-box F, having the sliding bottom G, made adjustable between guides H upon the top of the camera, as shown, in combination with the false bottom I, secured to the top of the camera and corresponding in thickness with G, the slot $a$, and the plate-elevator M, substantially as and for the purpose herein described.

2. In a photographic camera, the plate-elevator consisting of the horizontal bar M, having the spring R fixed beneath it, and having the bars N hinged to it at each end, while their opposite ends have nuts O loosely hinged to them, so as to traverse the screws P, together with the gears and crank, substantially as herein described.

In witness whereof I hereunto set my hand.

WILFRED LANGELON BROWN.

Witnesses:
FRANK E. BROWN,
GEO. T. KLINK.